United States Patent [19]

Gore et al.

US005312884A

[11] Patent Number: 5,312,884
[45] Date of Patent: May 17, 1994

[54] COPOLYMER USEFUL AS A POUR POINT DEPRESSANT FOR A LUBRICATING OIL

[75] Inventors: Robert H. Gore, Southampton; James H. O'Mara, Ambler, both of Pa.

[73] Assignee: Rohm and Haas Company, Phila, Pa.

[21] Appl. No.: 55,131

[22] Filed: Apr. 30, 1993

[51] Int. Cl.$^5$ .................... C08F 220/10; C08F 220/68
[52] U.S. Cl. ................... 526/328; 525/309; 526/328.5
[58] Field of Search .............. 525/309; 526/328, 328.5

[56] References Cited

U.S. PATENT DOCUMENTS

| | | | |
|---|---|---|---|
| 3,598,736 | 8/1971 | Van der Meij et al. | 526/328.5 |
| 3,772,258 | 11/1973 | Lachowicz | 526/328.5 |
| 3,869,396 | 3/1975 | Van de Kraats et al. | 526/328.5 |
| 3,951,929 | 4/1976 | Sweeney | 526/328.5 |
| 4,618,439 | 10/1986 | Brandi et al. | 252/47.5 |
| 4,867,894 | 9/1989 | Pennewiss et al. | 560/190 |
| 5,112,509 | 5/1992 | Brink, Jr. et al. | 526/328.5 |

FOREIGN PATENT DOCUMENTS

| | | |
|---|---|---|
| 0153209 | 8/1985 | European Pat. Off. |
| 140274 | 5/1985 | Fed. Rep. of Germany |
| 1172697 | 12/1969 | United Kingdom |

*Primary Examiner*—Vasu S. Jagannathan
*Attorney, Agent, or Firm*—Kevin E. McVeigh

[57] ABSTRACT

A copolymer useful as a pour point depressant for hydrocarbon lubricating oils includes from about 15 mole percent to about 67 mole percent comonomeric units derived from a ($C_8$-$C_{15}$) alkyl (meth)acrylate monomer, from about 3 mole percent to about 40 mole percent comonomeric units derived from a ($C_{16}$-$C_{24}$) alkyl (meth)acrylate monomers and from greater than 30 mole percent to about 65 mole percent comonomeric units derived from a ($C_1$-$C_4$)alkyl (meth)acrylate monomer.

26 Claims, No Drawings

COPOLYMER USEFUL AS A POUR POINT DEPRESSANT FOR A LUBRICATING OIL

TECHNICAL FIELD

The present invention relates to certain alkyl (meth)acrylate copolymers and their use as additives for lowering the pour point of hydrocarbon lubricating oils.

BACKGROUND

Lubricating base oils, e.g., commercial petroleum distillate oils, commonly contain paraffinic hydrocarbons that crystallize upon cooling thereby significantly increasing the viscosity of the oil. At a sufficiently low temperature, the crystalline wax structure ultimately causes gelation of the base oil. The low temperature fluidity of petroleum distillate oils can be improved by dewaxing and such oils are typically dewaxed to a pour point, i.e., the lowest temperature at which the oil remains fluid, of about $-15°$ C. Further lowering of the pour point is typically achieved by the use of a pour point lowering additive, i.e., a "pour point depressant", that further lowers the pour point of the dewaxed oil, typically down to about $-30°$ C.

The composition of petroleum distillate oils is variable and the relationship between base oil composition and the composition of those additives effective in lowering the pour point of any particular base oil is often poorly characterized. It is, therefore, not always possible to reliably prescribe a particular pour point depressant composition for effectively treating a particular base oil, i.e., treatment of any particular oil with pour point depressant remains, to a large extent, an empirical undertaking.

Poly(alkyl methacrylate) pour point depressants comprising higher alkyl esters, e.g., those including 12 or more carbon atoms per alkyl group, are known. It is believed that the elongated paraffin-like alkyl portions of such pour point depressants are incorporated into the growing paraffin crystals, thereby inhibiting further crystal growth and preventing formation of an extensive interlocking paraffin crystal structure. In U.S. Pat. No. 4,867,894, Pennewiss et al disclose a poly(alkyl methacrylate) pour point depressant wherein from 10 to 30, preferably 10 to 20, mole percent methylmethacrylate is copolymerized with alkylmethacrylate monomers having relatively long, i.e., $C_{16}$ and higher, alkyl groups to form a pour point depressant additive. Pennewiss et al teach that such an additive has a lower cost due to substitution of relatively low cost methyl methacrylate for a portion of relatively high cost higher alkyl esters and that, within the disclosed ranges of methyl methacrylate mole percent, such a substitution does not diminish the effectiveness of the additive as a pour point depressant.

There is a constant effort in the art to provide pour point depressants that provide cost effective performance in a wide range of lubricating oil base stocks.

SUMMARY OF THE INVENTION

A random copolymer is disclosed. The copolymer includes from about 15 mole percent to about 67 mole percent first repeating units wherein each of the first repeating units has the structural formula:

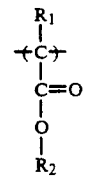

wherein each occurrence of $R_1$ is independently H or methyl and each occurrence of $R_2$ is independently selected from the group consisting of $(C_8-C_{15})$alkyl.

The copolymer includes from about 3 mole percent to about 40 mole percent second repeating units, wherein each of the second repeating units have the structural formula:

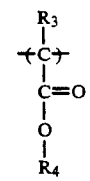

wherein each occurrence of $R_3$ is independently H or methyl and each occurrence of $R_4$ is independently selected from the group consisting of $(C_{16}-C_{24})$ alkyl.

The copolymer includes from greater than 30 percent to about 65 mole percent third repeating units, wherein each of the third repeating units have the structural formula:

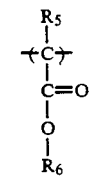

wherein each occurrence of $R_5$ is independently H or methyl and each occurrence of $R_6$ is independently selected from the group consisting of $(C_1-C_4)$alkyl.

The copolymer of the present invention provides high performance as a pour point lowering additive in a wide range of lubricating oil base stocks at a reduced cost.

A method for making a copolymer for use in lowering the pour point of a lubricating oil is disclosed. The method includes copolymerizing a mixture of monomers in a hydrocarbon diluent, wherein the monomer mixture includes from about 15 mole percent to about 67 mole percent of a $(C_8-C_{15})$alkyl (meth)acrylate monomer, from about 3 mole percent to about 40 mole percent of a $(C_{16}-C_{24})$alkyl (meth)acrylate monomer, and from greater than 30 mole percent to about 65 mole percent of a $(C_1-C_4)$alkyl (meth)acrylate monomer.

A pour point depressant composition is disclosed. The composition includes about 100 parts by weight of the copolymer of the present invention and from about 15 to about 600 parts by weight of a hydrocarbon diluent.

A method for lowering the pour point of a lubricating oil base stock is disclosed. The method includes adding to the base stock from about 0.02 weight percent to about 0.5 weight percent of the copolymer of the present invention.

A lubricating oil composition is disclosed. The composition includes a lubricating oil base stock and from about 0.02 weight percent to about 0.5 weight percent of the copolymer of the present invention.

DETAILED DESCRIPTION OF THE INVENTION

The random copolymer of the present invention includes from about 15 mole percent to about 67 mole percent first repeating units, each having the structural formula (1):

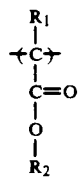
(1)

wherein each occurrence of $R_1$ is independently H or methyl and each occurrence of $R_2$ is independently selected from the group consisting of $(C_8-C_{15})$alkyl.

Preferably, $R_1$ is methyl.

As used herein, $(C_8-C_{15})$ alkyl means any straight or branched alkyl group having 8 to 15 carbon atoms per group, e.g., octyl, nonyl, decyl, isodecyl, undecyl, lauryl, tridecyl, myristyl, pentadecyl. Preferably, $R_2$ is $(C_{10}-C_{15})$alkyl. More preferably, $R_2$ is selected from the group consisting of isodecyl, lauryl, tridecyl, myristyl, pentadecyl and mixtures thereof.

Preferably, the copolymer includes from about 25 mole percent to about 60 mole percent first repeating units. More preferably, the copolymer includes from about 25 mole percent to about 40 mole percent first repeating units.

The copolymer includes from about 3 mole percent to about 40 mole percent second repeating units, each having the structural formula (2):

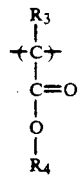
(2)

wherein each occurrence of $R_3$ is independently H or methyl and each occurrence of $R_4$ is independently selected from the group consisting of $(C_{16}-C_{24})$ alkyl.

Preferably, $R_3$ is methyl.

As used herein, $(C_{16}-C_{24})$ alkyl means any straight or branched alkyl group having 16 to 24 carbon atoms per group, e.g., stearyl, cetyl, heptadecyl, nonadecyl, eicosyl. Preferably, and $R_4$ is $(C_{16}-C_{24})$alkyl. More preferably, $R_4$ is selected from the group consisting of stearyl, cetyl, eicosyl and mixtures thereof.

Preferably, the copolymer includes from about 10 mole percent to about 35 mole percent second repeating units. More preferably, the copolymer includes from about 15 mole percent to about 30 mole percent second repeating units.

The copolymer includes from greater than 30 mole percent to about 67 mole percent third repeating units, each having the structural formula (3):

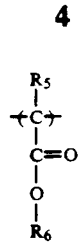
(3)

wherein each occurrence of $R_5$ is independently H or methyl and each occurrence of $R_6$ is independently selected from the group consisting of $(C_1-C_4)$alkyl.

Preferably, $R_5$ is methyl.

As used herein, $(C_1-C_4)$alkyl means any straight or branched alkyl group having 1 to 4 carbon atoms per group, e.g., methyl, ethyl, n-propyl, isopropyl, n-butyl, isobutyl, t-butyl. Preferably, $R_6$ is selected from the group consisting of methyl, n-butyl, isobutyl and mixtures thereof. Most preferably, $R_6$ is methyl.

Preferably, the copolymer includes from about 32 mole percent to about 50 mole percent third repeating units. More preferably, the copolymer includes from about 35 mole percent to about 45 mole percent third repeating units.

The copolymer of the present invention has a number average molecular weight, determined, e.g., by gel permeation chromatography, from about 20,000 to about 80,000, preferably from about 25,000 to about 70,000, and most preferably from about 28,000 to about 60,000.

The copolymer of the present invention has a weight average molecular weight, determined, e.g., by gel permeation chromatography, from about 50,000 to about 200,000, preferably from about 50,000 to about 175,000, and most preferably from about 50,000 to about 100,000.

The copolymer of the present invention can be made by free radical initiated polymerization of alkyl (meth)acrylate monomers. The terminology "(meth)acrylate" is used herein to generally refer to acrylate esters, methacrylate esters and mixtures thereof. Commercially available alkyl (meth)acrylate monomers may be, and typically are, mixtures of esters. Such mixtures are typically referred to, and are referred to herein, using a contracted version of the names of the ester species predominating in the mixture, e.g., "lauryl-myristyl methacrylate", "cetyl-eicosyl methacrylate", "cetyl-stearyl methacrylate", "dodecyl-pentadecyl methacrylate".

In a preferred embodiment, each of the first repeating units of the copolymer of the present invention is derived from a $(C_8-C_{15})$alkyl methacrylate monomer, preferably a $(C_{10}-C_{15})$alkyl methacrylate monomer.

As used herein, "$(C_8-C_{15})$alkyl methacrylate monomer" means an alkyl ester of methacrylic acid having a straight or branched alkyl group of 8 to 15 carbon atoms per group, including, e.g., octyl methacrylate, nonyl methacrylate, decyl methacrylate, isodecyl methacrylate, undecyl methacrylate, lauryl methacrylate, tridecyl methacrylate, myristyl methacrylate, pentadecyl methacrylate and mixtures thereof.

In a particularly preferred embodiment, each of the first repeating units of the copolymer of the present invention is derived from a monomer selected from the group consisting of isodecyl methacrylate, lauryl methacrylate, myristyl methacrylate, tridecyl methacrylate, pentadecyl methacrylate and mixtures thereof, e.g., lauryl-myristyl methacrylate, dodecyl-pentadecyl methacrylate.

In a preferred embodiment, each of the second repeating units of the copolymer of the present invention is derived from a ($C_{16}$–$C_{24}$)alkyl methacrylate monomer, preferably a ($C_{16}$–$C_{24}$)alkyl methacrylate monomer.

As used herein, "($C_{16}$–$C_{24}$)alkyl methacrylate monomer" means an alkyl ester of methacrylic acid having a straight or branched alkyl group of 16 to 24 carbon atoms per group, including, e.g., stearyl methacrylate, cetyl methacrylate, heptadecyl methacrylate, nonadecyl methacrylate, eicosyl methacrylate and mixtures thereof.

In a particularly preferred embodiment, each of the second repeating units of the copolymer of the present invention is derived from a monomer selected from the group consisting of stearyl methacrylate, cetyl methacrylate, eicosyl methacrylate and mixtures thereof, e.g., cetyl-stearyl methacrylate, cetyl-eicosyl methacrylate.

In a preferred embodiment, each of the third repeating units of the copolymer of the present invention is derived from a ($C_1$–$C_4$)alkyl methacrylate monomer.

As used herein, "($C_1$–$C_4$)alkyl methacrylate monomer" means a alkyl ester of methacrylic acid having a straight or branched alkyl group of 1 to 4 carbon atoms per group, including, e.g., methyl methacrylate, ethyl methacrylate, propyl methacrylate, butyl methacrylate.

In a particularly preferred embodiment, the third repeating units of the copolymer of the present invention are derived from a monomer selected from the group consisting of methyl methacrylate, n-butyl methacrylate, isobutyl methacrylate and mixtures thereof.

Most preferably, each of the third repeating units is derived from methyl methacrylate. Use of methyl methacrylate as the ($C_1$–$C_4$)alkyl monomer of the present invention provides the greatest cost advantage due to the relatively low cost of that monomer relative to higher alkyl (meth)acrylate monomers.

In a particularly preferred embodiment, the copolymer of the present invention includes about 43.9 mole percent first repeating units, each derived from lauryl methacrylate, about 14.7 mole percent second repeating units, each derived from cetyl-eicosyl methacrylate, and about 41.4 mole percent third repeating, each derived from methyl methacrylate.

In an alternative particularly preferred embodiment, the copolymer of the present invention includes about 35.2 mole percent first repeating units, each derived from lauryl methacrylate, about 22.5 mole percent second repeating units, each derived from cetyl-eicosyl methacrylate, and about 42.3 mole percent third repeating units, each derived from methyl methacrylate.

A reaction mixture including a diluent, selected relative amounts of respective selected alkyl (meth)acrylate monomers, a polymerization initiator and a chain transfer agent is prepared.

The diluent may be any inert hydrocarbon and is preferably a hydrocarbon lubricating oil which is compatible with or identical to the lubricating oil in which the copolymer is to be subsequently used. The mixture includes, e.g., from about 15 to about 400 parts by weight (pbw) diluent per 100 pbw total monomers and, more preferably, from about 50 to about 200 pbw diluent per 100 pbw total monomers. As used herein, "total monomer charge" means the combined amount of all monomers in the initial, i.e., unreacted, reaction mixture.

In a preferred embodiment of the process of the present invention, the total monomer charge includes from about 15 mole percent to about 65 mole percent, more preferably from about 25 mole percent to about 60 mole percent, and most preferably from about 25 mole percent to about 40 mole percent, ($C_8$–$C_{15}$)alkyl methacrylate monomer. In the preferred embodiment of the process, the monomer portion of the reaction mixture includes from about 3 mole percent to about 40 mole percent, more preferably from about 10 mole percent to about 35 mole percent, and most preferably from about 15 mole percent to about 30 mole percent, ($C_{16}$–$C_{24}$)alkyl methacrylate monomer. In the preferred embodiment, the monomer portion of the reaction mixture includes from greater than 30 mole percent to about 65 mole percent, preferably from about 32 percent to about 50 percent, and most preferably from about 35 mole percent to about 45 mole percent, ($C_1$–$C_4$)alkyl methacrylate monomer.

Suitable polymerization initiators include initiators which disassociate upon heating to yield a free radical, e.g., peroxide compounds such as benzoic peroxide, t-butyl peroctoate, cumene hydroperoxide, and azo compounds such as azoisobutylnitrile, 2,2'-azobis (2-methylbutanenitrile). T-butyl peroctoate is preferred as the polymerization initiator. The mixture includes, e.g., from about 0.25 pbw to about 1.0 pbw initiator per 100 pbw total monomer charge and, more preferably, from about 0.6 pbw to about 0.8 pbw initiator per 100 pbw total monomer charge.

Suitable chain transfer agents include those conventional in the art, e.g., dodecyl mercaptan, ethyl mercaptan. Dodecyl mercaptan is preferred as the chain transfer agent. The selection of the amount of chain transfer agent to be used is based on the desired molecular weight of the polymer being synthesized. The reaction mixture typically includes, e.g., from about 0.5 pbw to about 1.0 pbw chain transfer agent per 100 pbw total monomer charge and more preferably includes from about 0.6 pbw to about 0.8 pbw chain transfer agent per 100 pbw total monomer charge.

The reaction mixture is charged to a reaction vessel that is equipped with a stirrer, a thermometer and a reflux condenser and heated with stirring under a nitrogen blanket to a temperature from about 90° C. to about 125° C. The batch is then maintained at a temperature from about 90° C. to about 125° C. for a period of about 0.5 hours to about 6 hours to carry out the copolymerization reaction.

In a preferred embodiment, a portion, e.g., about 25 to 60%, of the reaction mixture is initially charged to the reaction vessel and heated. The remaining portion of the reaction mixture is then metered into the reaction vessel, with stirring and while maintaining the temperature of the batch within the above described range, over a period of about 0.5 hours to about 3 hours.

In the preferred embodiment of the process, an additional amount of initiator, e.g., from about 0.1 pbw to about 0.5 pbw initiator per 100 pbw total monomer charge, is then charged to the reaction vessel and the batch is then maintained at a temperature within the above-specified range with stirring for an additional period of about 0.5 hours to about 6 hours.

A viscous solution of the copolymer of the present invention in the diluent is obtained as the product of the above described process.

A base oil is treated with the copolymer of the present invention in a conventional manner, i.e., by adding the copolymer to the base oil to provide a lubricating oil composition having a desired pour point. A preferred embodiment of a lubricating oil includes from about 0.05 pbw to about 1.0 pbw copolymer per 100 pbw base oil. In a particularly preferred embodiment, the copolymer is added to the base oil in the form of a relatively concentrated solution of the copolymer in a diluent, e.g., a solution about 100 pbw of the copolymer dissolved in from about 15 pbw to about 600 pbw of the hydrocarbon diluent used in the above described polymerization process.

A copolymer of the present invention may advantageously be used in combination with another pour point lowering copolymer, e.g., with a different embodiment of the copolymer of the present invention or with a copolymer selected from known poly(alkyl(meth)acrylate) copolymers, to provide pour point lowering copolymer blends, e.g., blends including from about 50 pbw to about 100 pbw of a first embodiment of the copolymer of the present invention per 100 pbw of a second pour point lowering copolymer. Such blends may be custom formulated for optimal performance in a particular base oil.

A lubricating oil composition may include other additives in addition to the copolymer of the present invention, e.g., oxidation inhibitors such as dithiophosphate, detergent/corrosion inhibitors such as overbased metal sulfonates, antifoamants such as silicon polymers and viscosity index improvers such as poly(alkyl(meth)acrylate) copolymers, olefin copolymers, hydrogenated styrene-butadiene copolymers.

EXAMPLE 1

A monomer mix was prepared from 120 grams cetyleicosyl methacrylate (100% basis, 95.5% purity), 200 grams lauryl-myristyl methacrylate (100% basis, 97.5% purity), 80 grams methyl methacrylate (100% basis, 99.5% purity), 2.32 grams of a 50% solution of t-butyl peroctoate in mineral spirits, 2.80 grams dodecyl mercaptan, and 0.68 grams paraffinic base oil (100N oil). Part of the above monomer mix (30%) and 3.05 parts 100N oil were charged to a nitrogen flushed kettle fitted with a thermometer and a Thermowatch TM temperature controller, a water-cooled reflux condenser with nitrogen outlet, a stirrer, a nitrogen inlet, and an addition funnel to control the addition of the monomer mix. The contents of the kettle were heated to 105° C. with provisions for cooling to maintain the batch temperature below 120° C., thereby controlling any exotherm. The batch was maintained at 105° C. for about 5 minutes and then heated slowly to 115°-120° C. The remainder of the monomer mix was added uniformly over a 60 minute period after the batch temperature reached 115° C. The temperature was maintained at 115°-120° C. for 30 minutes following completion of the monomer feed. At this point an initiator feed of 1.6 grams of a 50% solution of t-butyl peroctoate in mineral spirits and 33.6 grams 100N oil was added to the flask over 60 minutes at 115°-120° C., after which the batch was held at the same temperature for an additional 30 minutes.

The process yielded a viscous solution of a copolymer in the base oil. Monomer conversion to polymer was approximately 97%. The polymer so formed exhibited a number average molecular weight of 31,200 and a weight average molecular weight of 81,300, each measured by gel permeation chromatography.

Approximately 39.92 parts 100N oil were then added to bring the batch to a final polymer solids content of 64%.

EXAMPLES 2 TO 19 AND C1 TO C4

The copolymers of Examples 2 to 19 and C1 to C4 were each made according to the process described above in Example 1, except that different amounts of the respective comonomers were used. Table 1 below sets forth the relative amounts (mole %) of the respective comonomers, i.e., cetyl-eicosyl methacrylate (CEMA), laurylmyristyl methacrylate (LMA), methyl methacrylate (MMA), isodecyl methacrylate (IDMA), for each of those Examples.

TABLE 1

| EXAMPLE NUMBER | CEMA/LMA/MMA/BMA/IDMA (mole %) |
|---|---|
| 2 | 19.8/56.6/33.6/0/0 |
| 3 | 18/36.4/45.6/0/0 |
| 4 | 17.4/33.5/49.1/0/0 |
| 5 | 16.4/28.0/55.6/0/0 |
| 6 | 11.3/33.9/54.8/0/0 |
| 7 | 16.7/50/33.3/0/0 |
| 8 | 14.7/43.9/41.4/0/0 |
| 9 | 19.8/46.6/33.6/0/0 |
| 10 | 18.6/39.6/41.8/0/0 |
| 11 | 25.7/40.2/34.1/0/0 |
| 12 | 22.5/35.2/42.5/0/0 |
| 13 | 30.6/34.9/34.5/0/0 |
| 14 | 28.6/28.4/43/0/0 |
| 15 | 7.2/52.2/40.6/0/0 |
| 16 | 21.3/0/39.9/0/38.8 |
| 17 | 12.2/46.7/41.1/0/0 |
| 18 | 14.1/42.2/0/43.6/0 |
| 19 | 15.4/46.0/0/38.6/0 |
| C1 | 25.1/74.9/0/0/0 |
| C2 | 39/61/0/0/0 |
| C3 | 23/67/13/0/0 |
| C4 | 21.3/54.6/24.1/0/0 |

EXAMPLES 20A TO 20GG

Each of Examples 20A to 20T and 20Z to 20BB were made by preparing a solution of 0.15 wt % (polymer solids) of a respective one of the copolymers of Examples 1-6 and C1, C3, C4 in a base oil. Each of Examples 20U to 20TY and 20CC to 20GG were made by preparing a solution of 0.19 wt % (polymer solids) of a respective one of the copolymers of Examples 15-19 in a base oil. The pour point of each of Example so formed was measured by both ASTM D-97-87 and "Cycle C" test methods. The sonic shear index of each of the Examples was measured by the method of ASTM D 2603-91 following 12.5 minutes sonic shearing.

The copolymer (Example No.), the lubricating oil base stock (A=Exxon 100N (ASTM pour point = −21° C.), B=Exxon 600N, C=Quaker State Congo 125N, D=Sentry 70 (ASTM pour point = −15° C.)), the ASTM pour point (°C.) and the Cycle C pour point (°C.) are each given below in Table 2 for each of Examples 20A to 20GG. Sonic Shear Index (SSI) values are also given for Examples 20A-20I, 20O-20T and 20Z-20BB.

TABLE 2

| EX- AMPLE NO. | ADDI- TIVE (EX. NO.) | BASE STOCK | ASTM POUR POINT (°C.) | CYCLE C POUR POINT (°C.) | SSI |
|---|---|---|---|---|---|
| 20A | C1 | A | −39 | −33 | 16.1 |
| 20B | C3 | A | −45 | F-39 | 19.2 |
| 20C | C4 | A | −39 | F-39 | 22.9 |
| 20D | 2 | A | −39 | F-39 | 24.9 |
| 20E | 1 | A | −39 | F-39 | 15.3 |
| 20F | 3 | A | −39 | F-39 | 17.6 |
| 20G | 4 | A | −39 | −39 | 16 |

TABLE 2-continued

| EX-AMPLE NO. | ADDITIVE (EX. NO.) | BASE STOCK | ASTM POUR POINT (°C.) | CYCLE C POUR POINT (°C.) | SSI |
|---|---|---|---|---|---|
| 20H | 5 | A | −36 | F-39 | 14.2 |
| 20I | 6 | A | −39 | −39 | 16.0 |
| 20J | 15 | A | −27 | −33 | — |
| 20K | 16 | A | −27 | −27 | — |
| 20L | 17 | A | −33 | −36 | — |
| 20M | 18 | A | −33 | F-39 | — |
| 20N | 19 | A | −36 | F-39 | — |
| 20O | C1 | B | −20 | −24 | 16.1 |
| 20P | 2 | B | −21 | −24 | 24.9 |
| 20Q | 1 | B | −24 | −24 | 15.3 |
| 20R | C1 | C | −33 | −33 | 16.1 |
| 20S | 2 | C | −30 | −33 | 24.9 |
| 20T | 1 | C | −36 | −33 | 15.3 |
| 20U | 15 | C | −33 | −33 | — |
| 20V | 16 | C | −21 | −24 | — |
| 20W | 17 | C | −36 | −30 | — |
| 20X | 18 | C | −36 | −33 | — |
| 20Y | 19 | C | −36 | −33 | — |
| 20Z | C1 | D | −27 | −30 | 16.1 |
| 20AA | 2 | D | −24 | −30 | 24.9 |
| 20BB | 1 | D | −24 | −30 | 19.2 |
| 20CC | 15 | D | −12 | −12 | — |
| 20DD | 16 | D | −13 | −12 | — |
| 20EE | 17 | D | −15 | −12 | — |
| 20FF | 18 | D | −15 | −12 | — |
| 20GG | 19 | D | −12 | −12 | — |

The viscosity of each of Examples 20A, 20E, 20O, 20Q, 20R, 20T, 20Z and 20BB was measured at −15°, −20°, −25°, −30°, and −35° C. using a mini rotary viscometer (MRV) according to the method of ASTM D 4684-89.

Results are set forth below in Table 3 as apparent viscosity (Poise) at each temperature for each of those Examples. A Borderline Pumping Temperature (BPT) is also set forth for each Example. The notation "TFTM" (too fluid to measure) is used in Table 3 to indicate that the viscosity of a particular sample was too low to measure in using the MRV at the indicated temperature

TABLE 3

| EX. NO. | −15° C. | −20° C. | −25° C. | −30° C. | −35° C. | BPT |
|---|---|---|---|---|---|---|
| 20A | — | — | TFTM | 28.3 | 92.3 | >−35 |
| 20E | — | — | TFTM | 27.6 | 82.8 | >−35 |
| 20O | 119 | 280 | 1168 | — | — | −19.8 |
| 20Q | 125 | 269 | 1057 | — | — | −19.9 |
| 20R | — | — | 29.0 | 69.7 | 182 | −36.9 |
| 20T | — | — | 17.7 | 63.1 | 200 | −35.8 |
| 20Z | 136 | 276 | 963 | — | — | −19.8 |
| 20BB | 112 | 235 | 778 | — | — | −20.8 |

EXAMPLES 21 AND C22

Two series of samples, 21A to 21H and C22A to C22G, were made by dissolving the respective copolymers of Examples 1 and C1 in a base oil (Quaker State 125N) to provide formulations having the compositions given in Table 4.

The ASTM D 97-87 pour point (°C) and Cycle C pour point (°C) were each measured for each sample and are given in Table 4.

TABLE 4

| EXAMPLE NO. | WT % POLYMER SOLIDS | ASTM POUR POINT (°C.) | CYCLE C POUR POINT (°C.) |
|---|---|---|---|
| Base Stock | 0.00 | −12 | −12 |
| 21A | 0.16 | −36 | −33 |
| 21B | 0.12 | −36 | −33 |
| 21C | 0.11 | −36 | −33 |
| 21D | 0.08 | −36 | −30 |
| 21E | 0.053 | −30 | −30 |
| 21F | 0.04 | −27 | −30 |
| 21G | 0.32 | −30 | −30 |
| 21H | 0.026 | −27 | −33 |
| C22A | 0.15 | −36 | −33 |
| C22B | 0.112 | −36 | −30 |
| C22C | 0.10 | −36 | −30 |
| C22D | 0.075 | −33 | −30 |
| C22E | 0.05 | −33 | −30 |
| C22F | 0.038 | −33 | −33 |
| C22G | 0.025 | −33 | −27 |

EXAMPLES 23A TO 23 J

The copolymers of Examples C1, C2 and 9 to 16 were added to an SAE 15W-40 lubricating oil (0.15 wt % copolymer solids in Imperial PL23720-1 oil). The shear stability of each of the Examples was measured by ASTM D 2603-91. The viscosity of each of the samples was measured by ASTM D 4684-89 at −20° C. and −25° C. using a mini rotary viscometer. The pour point of each of the samples was measured according to the Cycle C test method.

The shear stability following 12.5 minute sonic shear (% SLDTP), the percent bulk (weight %), the Cycle C pour point (°C.) and the D 4684-89 apparent viscosity (Poise) at −20° C. and −25° C. is forth below in Table 4 for each of the Examples.

TABLE 5

| EX. NO. | ADDITIVE EX. NO. | % SLDTP | % BULK | CYCLE C POUR POINT | Viscosity (Poise) −20° C. | Viscosity (Poise) −25° C. |
|---|---|---|---|---|---|---|
| 23A | C1 | 16.1 | 0.260 | −18 | 9036* | Solid |
| 23B | 9 | 16.6 | 0.258 | −30 | 3133* | Solid |
| 23C | 10 | 12.3 | 0.260 | −30 | 154 | 427 |
| 23D | 11 | 13.9 | 0.258 | −36 | 162 | 458 |
| 23E | 12 | 17.2 | 0.258 | −36 | 142 | 411 |
| 23F | C2 | 15.3 | 0.254 | −36 | 156 | 430* |
| 23G | 13 | 13.3 | 0.179 | −36 | 161 | 432* |
| 23H | 14 | 16.0 | 0.344 | −36 | 145 | 373* |
| 23I | 15 | 16.6 | 0.258 | −36 | 154 | 403* |
| 23J | 16 | 12.0 | 0.258 | −36 | 159 | 410* |

*Yield stress present

EXAMPLES C24A, C24B AND 25A TO 25C

A group of SAE 10W-30 lubricating oils, Examples C24A, C24B and 25A to 25C, were formulated by combining a base oil with a viscosity index improver, a pour point depressant, an ashless dispersant, and a detergent-/inhibitor package ("DI package") in the amounts set forth below in Table 6 (amounts are given as weight percents).

TABLE 6

| | C24A | C24B | 25A | 25B | 25C |
|---|---|---|---|---|---|
| Viscosity Index Improver (Exxon ECA 13111) | 7.0 | 7.0 | 7.0 | 7.0 | 7.0 |
| Pour point Depressant Example C3 | — | 0.2 | — | — | — |
| Example C1 | — | — | 0.2 | — | — |
| Example 1 | — | — | — | 0.2 | — |
| Example 4 | — | — | — | — | 0.2 |
| Ashless Dispersant (Amoco 9250) | 2.0 | 2.0 | 2.0 | 2.0 | 2.0 |
| DI Package (Amoco PC800-4) | 10.45 | 10.45 | 10.45 | 10.45 | 10.45 |
| Base Stock (Pennzoil HF 150N) | 80.55 | 80.35 | 80.35 | 80.35 | 80.35 |

The kinematic viscosity of each of Examples C24A, C24B and 25A to 25C was measured by the method of ASTM D445-88. The pour point of each of the Examples was measured by the methods of ASTM D 97-87 and Cycle "C". The viscosity of each of the Examples was measured by ASTM D4684-89 using a mini rotary viscometer (MRV).

Results are set forth below in Table 7 as viscosity (centiStokes), ASTM pour point (°C.), MRV viscosity (Poise) and borderline pumping temperature (BPT,°C.).

TABLE 7

| EX. NO. | C24A | C24B | 25A | 25B | 25C |
|---|---|---|---|---|---|
| 100C Vis., cSt | 11.16 | 11.23 | 11.11 | 11.22 | 11.19 |
| CCS Vis., −20° C. | 3100 | 2860 | 3060 | 2910 | 2840 |
| ASTM Pour Point, C | −18 | −33 | −36 | −30 | −30 |
| Cycle C Pour Point, C | −33 | −33 | −33 | −33 | −30 |
| TP-1 MRV, P, −20° C. | 35.2 | 32.6 | 16.7 | 34.0 | 34.7 |
| TP-1 MRV, P, −25° C. | 81.9 | 69.9 | 77.1 | 77.6 | 74.6 |
| TP-1 MRV, P, −30° C. | 205 | 189 | 197 | 210 | 201 |
| TP-1 MRV, P, −35° C. | 720* | 589 | 620 | 680 | 618 |
| TP-1 MRV BPT, C | −31.6 | −32.2 | −32.0 | −31.7 | −32.0 |
| MRV, P, −20° C. | 39.7 | 31.4 | 36.2 | 32.8 | 33.6 |
| MRV, P, −25° C. | 105 | 70.5 | 73.6 | 77.8 | 74.6 |
| MRV, P, −30° C. | 544* | 182 | 186 | 207 | 190 |
| MRV, P, −35° C. | — | 521 | 560 | 608 | 533 |
| MRV BPT, C | −28.4 | −32.6 | −32.3 | −31.9 | −32.4 |

EXAMPLE 26

A group of lubricating oil samples, Examples 26A to 26O, were formulated by adding a pour point lowering copolymer or a 50/50 wt % mixture of two different pour point lowering copolymers to an SAE 15W-40 lubricating oil (Imperial PL 23720-1) at a level of 0.08 weight % copolymer solids. The pour point of each Example was measured by the "Cycle C" test method and the apparent viscosity of each of the Examples was measured by the method of ASTM D 4684-89 at −20° C. and −25° C. using a mini-rotary viscometer.

The pour point lowering copolymers are identified (EX. No.) and the Cycle C pour point (°C.) and the apparent viscosity (Poise) at −20° C. and −25° C. are given below in Table 10 for each of Examples 26A to 26O.

TABLE 10

| EX. No. | ADDITIVES (EX. NO.) | CYCLE C POUR POINT (°C.) | Viscosity (Poise) −20° C. | −25° C. |
|---|---|---|---|---|
| 26A | C1 | −12 | Solid | Solid |
| 26B | C2 | −33 | 162 | 436* |
| 26C | C1/C2 | −36 | 157 | 415* |
| 26D | 7/11 | −36 | 99.8 | 265 |
| 26E | 18/12 | F-39 | 106 | 253 |
| 26F | 7/C2 | −36 | 109 | 288* |
| 26G | 8/C2 | −33 | 103 | 287 |
| 26H | C1/11 | F-39 | 106 | 271* |
| 26I | C1/12 | F-39 | 109 | 284 |
| 26J | 9/13 | −36 | 98.1 | 230 |
| 26K | 10/14 | −30 | 107 | 265 |
| 26L | 9/C2 | −33 | 101 | 254 |
| 26M | 10/C2 | −36 | 111 | 267* |
| 26N | C1/13 | −33 | 162 | 408* |
| 26O | C1/14 | −33 | 112 | 257* |

*Yield stress present

The pour point lowering copolymer of the present invention includes a large relative amount of repeating units derived from lower alkyl (meth)acrylate monomers, i.e., from greater than 30 mole percent to about 65 mole percent monomeric units derived from a ($C_1$-$C_4$)alkyl (meth)acrylate monomer, most preferably methyl methacrylate. The copolymer provides high performance as a pour point lowering additive in a wide range of base oils at a reduced cost relative to pour point lowering copolymers that include a smaller relative amount of lower, i.e., $C_1$-$C_4$, alkyl (meth)acrylate comonomeric units and a larger relative amount of higher, i.e., $C_8$-$C_{24}$, alkyl (meth)acrylate comonomeric units.

We claim:

1. A random copolymer, comprising: from about 15 mole percent to about 67 mole percent first repeating units, each of said first repeating units having the structural formula:

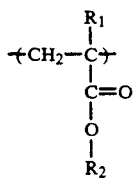

wherein
each occurrence of $R_1$ is independently H or methyl and each occurrence of $R_2$ is independently selected from the group consisting of ($C_8$–$C_{15}$) alkyl;
from about 3 mole percent to about 40 mole percent second repeating units, each of said second repeating units having the structural formula:

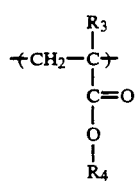

wherein
each occurrence of $R_3$ is independently H or methyl and each occurrence of $R_4$ is independently selected from the group consisting of ($C_{16}$–$C_{24}$) alkyl; and
from greater than 30 mole percent to about 65 mole percent third repeating units, each of said third repeating units having the structural formula:

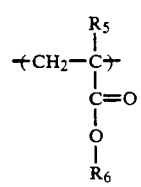

wherein
each occurrence of $R_5$ is independently H or methyl and each occurrence of $R_6$ is independently selected from the group consisting of ($C_1$–$C_4$) alkyl; and
said copolymer having a number average molecular weight of about 20,000 to about 80,000 and a weight average molecular weight of about 50,000 to about 200,000.

2. The copolymer of claim 1, wherein the copolymer comprises from about 25 mole percent to about 60 mole percent first repeating units.

3. The copolymer of claim 2, wherein the copolymer comprises from about 25 mole percent to about 40 mole percent first repeating units.

4. The copolymer of claim 1, wherein the copolymer comprises from about 10 mole percent to about 35 mole percent second repeating units.

5. The copolymer of claim 4, wherein the copolymer comprises from about 15 mole percent to about 30 mole percent second repeating units.

6. The copolymer of claim 1, wherein the copolymer comprises from about 32 mole percent to about 50 mole percent third repeating units.

7. The copolymer of claim 6, wherein the copolymer comprises from about 35 mole percent to about 45 mole percent third repeating units.

8. The copolymer of claim 1, wherein $R_1$, $R_3$ and $R_5$ are each methyl.

9. The copolymer of claim 1, wherein $R_4$ is selected from the group consisting of stearyl, cetyl, eicosyl and mixtures thereof.

10. The copolymer of claim 1, wherein $R_2$ is selected from the group consisting of isodecyl, lauryl, tridecyl, myristyl, pentadecyl and mixtures thereof.

11. The copolymer of claim 10, wherein $R_2$ is selected from the group consisting of lauryl, tridecyl, myristyl, pentadecyl and mixtures thereof.

12. The copolymer of claim 1, wherein $R_6$ is selected from the group consisting of methyl, n-butyl, isobutyl and mixtures thereof.

13. The copolymer of claim 12, wherein $R_6$ is methyl.

14. The copolymer of claim 1, wherein the copolymer has a number average molecular weight from about 25,000 to about 70,000.

15. The copolymer of claim 14, wherein the copolymer has a number average molecular weight from about 28,000 to about 60,000.

16. The copolymer of claim 1, wherein the copolymer has a weight average molecular weight from about 50,000 to about 175,000.

17. The copolymer of claim 16, wherein the copolymer has a weight average molecular weight from about 50,000 and about 100,000.

18. The copolymer of claim 1, wherein each of the first repeating units is derived from a ($C_8$–$C_{15}$)alkyl methacrylate monomer.

19. The copolymer of claim 18, wherein the ($C_8$–$C_{15}$)alkyl methacrylate monomer is selected from the group consisting of isodecyl methacrylate, lauryl methacrylate, tridecyl methacrylate, myristyl methacrylate, pentadecyl methacrylate and mixtures thereof.

20. The copolymer of claim 1, wherein each of the second repeating units is derived from a ($C_{16}$–$C_{24}$)alkyl methacrylate monomer.

21. The copolymer of claim 20, wherein the ($C_{16}$–$C_{24}$)alkyl methacrylate monomer is selected from the group consisting of stearyl methacrylate, cetyl methacrylate, eicosyl methacrylate and mixtures thereof.

22. The copolymer of claim 1, wherein each of the third repeating units is derived from a ($C_1$–$C_4$)alkyl methacrylate monomer.

23. The copolymer of claim 22, wherein the ($C_1$–$C_4$)alkyl methacrylate monomer is selected from the group consisting of methyl methacrylate, n-butyl methacrylate, isobutyl methacrylate and mixtures thereof.

24. The copolymer of claim 23, wherein the ($C_1$–$C_4$)alkyl methacrylate monomer is methyl methacrylate.

25. The copolymer of claim 1, comprising about 43.9 mole percent first repeating units derived from lauryl methacrylate, about 14.7 mole percent second repeating units derived from cetyl-eicosyl methacrylate and about 41.4 mole percent third repeating units derived from methyl methacrylate.

26. The copolymer of claim 1, comprising about 35.2 mole percent first repeating units derived from lauryl methacrylate, about 22.5 mole percent second repeating units derived from cetyl-eicosyl methacrylate and about 42.3 mole percent third repeating units derived from methyl methacrylate.

* * * * *

UNITED STATES PATENT AND TRADEMARK OFFICE
CERTIFICATE OF CORRECTION

PATENT NO. : 5,312,884

DATED : May 17, 1994

INVENTOR(S) : R. H. Gore, J.H. O'Mara

It is certified that error appears in the above-identified patent and that said Letters Patent is hereby corrected as shown below:

Column 2, line 1: " 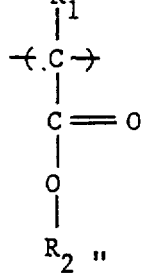 should be: -- 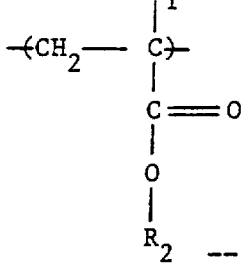 --

Column 2, line 17: " 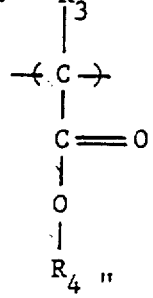 should be: -- 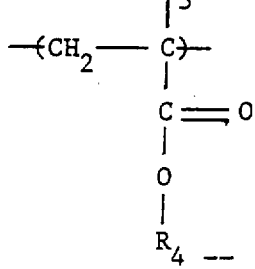 --

UNITED STATES PATENT AND TRADEMARK OFFICE
CERTIFICATE OF CORRECTION

PATENT NO. : 5,312,884

DATED : May 17, 1994

INVENTOR(S): R. H. Gore, J.H. O'Mara

It is certified that error appears in the above-identified patent and that said Letters Patent is hereby corrected as shown below:

Column 2, line 35:

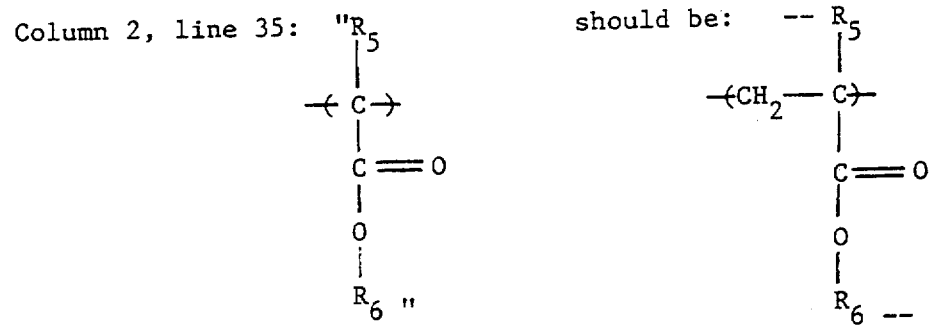

Column 3, line 15:

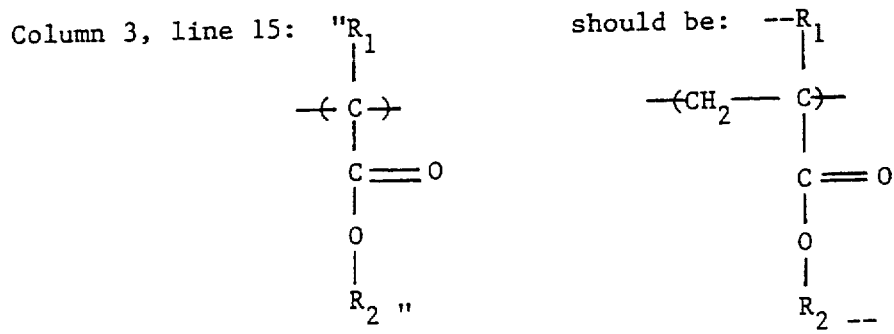

UNITED STATES PATENT AND TRADEMARK OFFICE
CERTIFICATE OF CORRECTION

PATENT NO. : 5,312,884

DATED : May 17, 1994

INVENTOR(S): R. H. Gore, J. H. O'Mara

It is certified that error appears in the above-identified patent and that said Letters Patent is hereby corrected as shown below:

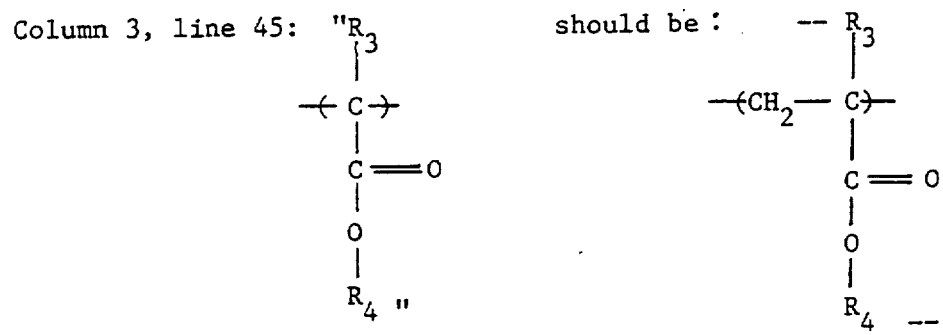

UNITED STATES PATENT AND TRADEMARK OFFICE
CERTIFICATE OF CORRECTION

PATENT NO. : 5,312,884
DATED : May 17, 1994
INVENTOR(S) : R. H. Gore, J. H. O'Mara It is certified that error appears in the above-indentified patent and that said Letters Patent is hereby corrected as shown below:

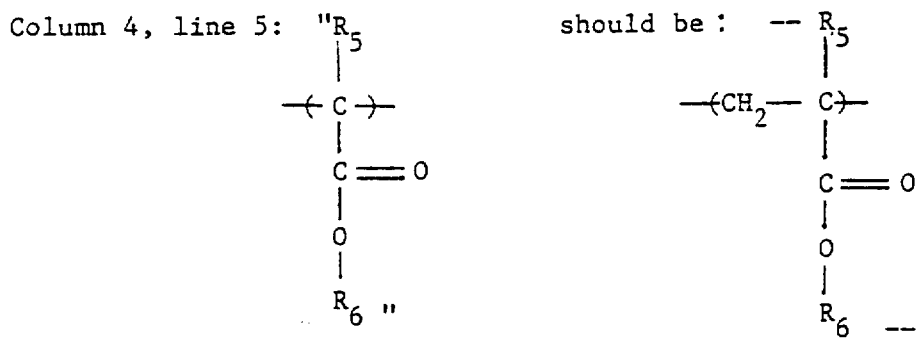

Signed and Sealed this

Eleventh Day of October, 1994

Attest:

BRUCE LEHMAN

Attesting Officer     Commissioner of Patents and Trademarks